United States Patent [19]

Schott

[11] Patent Number: 4,506,773

[45] Date of Patent: Mar. 26, 1985

[54] ELECTRICALLY CONTROLLED HYDRAULIC CLUTCH FOR A FRONT WHEEL DRIVE

[75] Inventor: Robert E. Schott, New Berlin, Wis.

[73] Assignee: Allis-Chalmers Corporation, Milwaukee, Wis.

[21] Appl. No.: 462,398

[22] Filed: Jan. 31, 1983

[51] Int. Cl.³ ............... F16D 25/063; F16D 29/00; B60K 41/00

[52] U.S. Cl. ................... 192/52; 192/84 R; 192/85 R; 192/109 F; 180/247; 137/625.64

[58] Field of Search .......... 192/52, 109 F, 84 R, 192/85 R; 180/247; 137/625.64

[56] References Cited

U.S. PATENT DOCUMENTS

| | | | |
|---|---|---|---|
| 3,552,516 | 1/1971 | Beard et al. | 180/247 X |
| 3,674,121 | 7/1972 | Copeland | 192/85 R X |
| 3,680,652 | 8/1972 | Greene | 180/247 X |
| 3,833,100 | 9/1974 | Aschauer | 192/106 F |
| 3,841,423 | 10/1974 | Holtkamp et al. | 180/247 X |
| 3,988,951 | 11/1976 | Mair et al. | 74/864 |
| 4,099,588 | 7/1978 | Dezelan | 180/247 X |
| 4,138,004 | 2/1979 | Horsch | 192/109 F X |
| 4,233,857 | 11/1980 | Quick | 74/665 G A |
| 4,369,671 | 1/1983 | Matsumoto et al. | 180/247 X |
| 4,401,182 | 8/1983 | Pollman | 180/197 X |

FOREIGN PATENT DOCUMENTS

| | | | |
|---|---|---|---|
| 1810206 | 7/1970 | Fed. Rep. of Germany | 137/625.64 |
| 39871 | 3/1980 | Japan | 180/247 |

Primary Examiner—Rodney H. Bonck
Assistant Examiner—David D. House
Attorney, Agent, or Firm—Arthur L. Nelson

[57] ABSTRACT

A rear wheel drive vehicle is converted to a four-wheel drive vehicle by operation of a hydraulically operated clutch which is controlled by a hydraulic valve. The hydraulic valve is spring biased to a clutch disengaged position and is hydraulically actuated to its clutch engaged position through operation of a pilot valve circuit which includes an electrically operated solenoid valve. The pilot valve circuit includes a flow restrictor providing modulated flow thereby affording a controlled pressure rise in the clutch whereby a smooth engagement of the front wheel drive is achieved.

7 Claims, 4 Drawing Figures

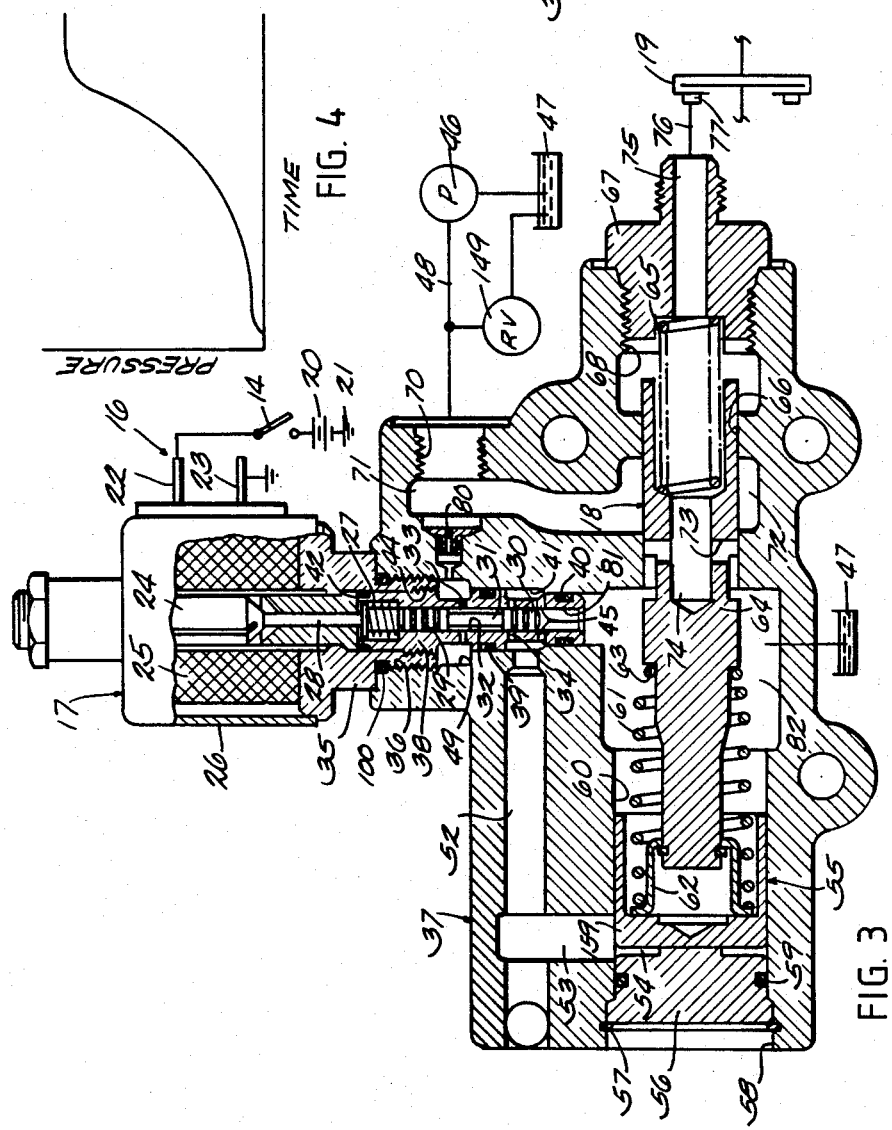

ELECTRICALLY CONTROLLED HYDRAULIC CLUTCH FOR A FRONT WHEEL DRIVE

This invention relates to a front wheel drive system on a tractor and, more particularly, to an electrically controlled hydraulic modulating valve for operating a hydraulic clutch on the front wheel drive system.

Front wheel drive systems on tractors may provide a continuous drive such as those used on four wheel drive tractors. On the four wheel drive tractors, all four wheels are generally of the same size. The conventional two wheel drive tractor employs larger rear drive wheels than the front steerable wheels. A modified version of the conventional two wheel drive may employ front wheel drive which usually is a part-time drive arrangement in which the front wheels can be used as traction wheels for assisting in driving of the tractor when greater traction is needed due to the soil conditions. The front wheel drive may be a mechanical drive in which a gear train in the main transmission is usually used to provide a drive line to the front wheels and a clutch can be selectively engaged or disengaged at the option of the operator. Hydraulic drive has also been used as a front wheel assist in driving the front wheels. The hydraulic drive has the advantage that the synchronization of the rear wheels and the front wheels is automatically provided in the hydraulic system with drive on all four wheels. Hydraulic drive systems, however, do require a rather sophisticated and inefficient drive system with drive motors mounted on the front wheels and substantially larger hydraulic pumps to accommodate the power which is directed through the front wheel drive system. Accordingly, the mechanical four wheel drive has some inherent advantages in that the drive line is usually simpler and more efficient. The speed of rotation and the traction of the front and rear wheels can be designed so that the front wheels are driving slightly faster than the rear wheels and are pulling the tractor instead of a faster drive on the rear wheels which would tend to push the front wheels with some loss of traction and steering. Accordingly, a gear train is provided from the main transmission to drive the front wheels. One of the problems, however, with the conventional mechanical front wheel drive is that the engaging and disengaging of the clutch can produce roughness and jerkiness. A hydraulic clutch and power shift provides the advantage of being able to engage the front wheel drive any time traction is needed. Accordingly, the applicant's invention provides a solenoid valve which is electrically operated with the control conveniently located for the operator. When additional traction is needed, the front wheel drive can easily be engaged through a switch and a solenoid valve. The solenoid valve connects a modulating valve in a hydraulic system on the tractor to engage a power shift clutch to the transmission. Instead of directing the hydraulic fluid from the solenoid valve direction to the hydraulic clutch, it is directed through a modulating valve which, in turn, modulates the fluid pressure and gradually increases the pressure applied to the clutch. In this manner, engagement of the power shift clutch for the front wheel drive is operated without any roughness or jerkiness in the drive system. The solenoid provides two positions for the valve. Opening of the solenoid valve automatically operates the modulating valve which, in turn, applies pressurized fluid to the hydraulic clutch operating the front wheel drive line. A gradual pressure increase in modulating of the hydraulic fluid to the clutch engages the clutch to provide drive on the front wheels to provide additional traction when necessary. The electrical control for the solenoid valve does not require much space and is convenient to operate by the operator. The switch for the solenoid valve may be positioned on the control console or on the instrument panel, or the steering column. When the traction for the front wheel drive is no longer necessary, it can be conveniently disconnected through the switch to the solenoid valve. Pressurized fluid in the modulating valve decreases and releases the power shift clutch for the front wheel drive and drive is through the rear wheels only. Under certain operating conditions, it is an advantage to leave the front wheel drive in engagement since it does reduce slippage for the traction system for the vehicle. With the mechanical drive, the parasitic losses are not as great as when a hydraulic system is used as to continually drive the front wheels since the drive line for the front wheel drive merely taps off power at the transmission to provide additional traction. Accordingly, the front wheel drive can be used to provide more traction whenever needed, depending on soil conditions, or may be used as a continuous drive, if so desired, depending on the operating conditions for the tractor.

The Quick patent, U.S. Pat. No. 4,233,857, illustrates a multiple speed transmission with auxiliary transfer drive for the front wheel drive on a tractor. The system provides a mechanical drive from the transmission and means for selectively engaging the clutch for front wheel drive on the tractor. The drive line for the front wheel drive system, however, does not provide the modulated fluid pressure to a hydraulic clutch which can be selectively engaged and disengaged while the vehicle is in operation. Accordingly, it is believed the applicant's invention for the use of an electrically operated solenoid valve for operating the modulating valve for the power shift clutch is distinguishable over this reference.

Accordingly, it is an object of this invention to provide a solenoid controlled modulating valve for operating a hydraulic clutch of a front wheel drive line.

It is another object of this invention to provide a solenoid valve operating a pressure modulating valve for selectively engaging and disengaging a power shift clutch of a hydraulic front wheel drive line.

It is a further object of this invention to provide a solenoid operated control valve operating in conjunction with an accumulator operator pressure reducing valve for modulating fluid pressure to operate a power shift clutch for engaging and disengaging a front wheel drive on a tractor.

The objects of this invention are accomplished with the use of a solenoid operated hydraulic valve in an electrical circuit having a switch at the operator station to operate a front wheel drive line on a tractor. The solenoid operates an accumulator operated pressure reducing valve to modulate fluid pressure from a source of pressurized fluid which is supplied to a power shift clutch for the front wheel drive line. Modulation of increasing fluid pressure applied to the power shift clutch provides a smooth transition of power to the front wheel drive line as the power shift clutch is engaged and a decreasing fluid pressure applied to the power shift clutch when the front wheel drive line is disengaged. The drive line for the front wheel drive is provided through a gear train from the main transmission through a power shift clutch and drive shafts and universal joints to transmit power through a differential and drive shafts to the front wheels of the tractor. The drive line can be used as a front wheel assist for drive whenever the traction conditions of the soil require the use of four wheel drive or may be used for such operations in which four wheel drive and the added traction for the tractor provides a definite advantage for continuous four wheel drive of the vehicle.

The preferred embodiment of this invention is illustrated in the attached drawings.

FIG. 2 illustrates an end view of the solenoid operated valve and modulating valve.

FIG. 3 is a cross-section view taken on line III—III of FIG. 2.

FIG. 4 is a graph illustrating the pressure rise of a pressurized fluid applied to a hydraulic power shift clutch.

Figure 1:
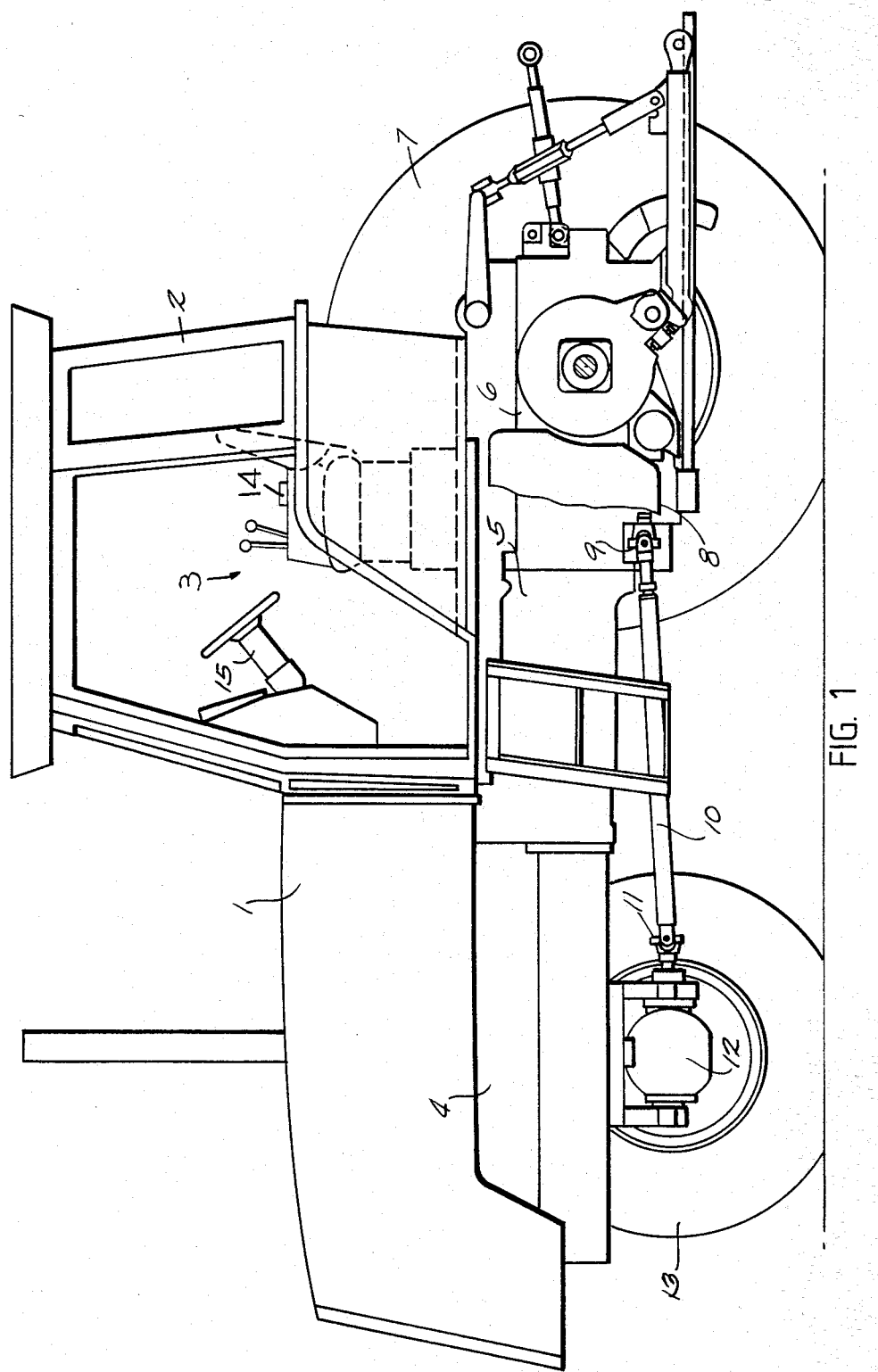
FIG. 1 is a partially sectioned side elevation view of a tractor utilizing a front wheel drive system.

Referring to the drawings, FIG. 1 illustrates a side elevation view of a tractor 1 with a cab 2 defining an operator station 3. The engine 4 drives through the transmission 5 to the final drive line 6 for driving the rear wheels of which wheel 7 is shown. The front wheel drive drives from gear train 8 through a clutch driving the universal joint 9 and propeller shaft 10 to the universal joint 11 and the differential 12 to drive the front wheels of which the wheel 13 is shown. The front wheel drive system is controlled electrically and may be operated conveniently by switch 14 on the console to the right of the operator in the operator station 3. The switch 14 is at a convenient location in the cab to provide the operator the option in using four wheel drive or the conventional two wheel drive as desired. The rear wheel drive system is through the transmission, preferably a power shift transmission, which provides a means whereby the speed ratios for the transmission can be shifted while the tractor is moving.

FIG. 3 shows the control circuit 16 connected to the solenoid valve 17 for operating the modulating valve 18 controlling the hydraulic clutch 19 which operates as a power shift clutch in the front wheel drive line for the tractor. Electrical circuit 16 includes a battery 20 connected to ground 21 and through the switch 14 to the terminal 22 of the solenoid valve. The terminal 23 is connected to ground as indicated. Essentially, the switch 14 is an on/off switch which can be selectively operated by the operator of the vehicle whenever front wheel drive is considered necessary, depending on the job requirements.

The solenoid valve 17 includes an armature 24 reciprocating within the coil 25 responsive to operation of the switch 14. The coil 25 is encased in the casing 26 and reciprocates the armature 24. Normally, the armature is biased to a return position by the spring 27 and is electrically operated to move against the biasing force of the spring 27 to the engaged position by the coil 25.

The pin 28 makes contact with armature 24 and plunger 31 that has two lands 29 and 30 and an annular recess 32. The annular recess 32 provides a passage between the inlet port 33 and the outer or accumulator port 34.

The base 35 of the solenoid valve 17 and seal 100 are received in a threaded opening 36 of the valve housing 37. Base 35 of the solenoid valve 17 carries a sleeve 38 at its lower end. The sleeve 38 carries the O-ring seals 39, 40 to seal the annular recess 41 on the sleeve 38. The sleeve 38 is sealed with the base 35 by an O-ring seal 42. The upper end of the sleeve 38 threadedly engages the base 35 in the opening 44 of the base 35. Sleeve 38 is formed with the sump ports 45 at the lower end of the land 30 on the plunger 31.

The hydraulic system includes essentially a pump 46 receiving fluid from the sump 47 and pressurizing fluid in the conduit 48. A relief valve 149 connected to conduit 48 returns excess fluid to the sump 47. The conduit 48 is connected to input port 70, which in turn is connected to an internal passage or chamber 71 placing the input port 70 in fluid communication with the inlet port 33 which is connected to the annular recess 49. The passage 71 also places the input port 70 in fluid communication with the bore 66 in which a clutch control valve spool 64 is reciprocatably positioned. In the retracted position of the solenoid as shown in FIG. 3, pressurized fluid is allowed to pass through the annular recess 49 and recess 32 and outlet port 34 and annular recess 41. Annular recess 41 is connected to the passages 52 and 53 and together therewith comprise an accumulator supply passage in the valve housing 37 connecting the accumulator port 34 in fluid communication with the pressurizing chamber 54 in the accumulator 55. Pressurizing chamber 54 is formed by the cap 56 held in position by a snap ring 57 within the opening 58. An O-ring seal 59 forms a seal between the cap and the valve housing 37. An accumulator piston 159 reciprocates within the cylinder formed by the opening or bore 60 of housing 37 against biasing force of the spring 61. The spring 61 is compressively positioned between the spring seat 62 and the shoulder 63 of the spool 64. The spring seat 62 and coil spring 61 comprise axial thrust transmitting means operatively interposed between the piston 159 and the control spool 64. The spool 64 is normally biased in the right-hand position by the spring 61 while the spring 65 biases the spool in the left-hand direction a clutch disengaged position as shown in FIG. 3. The spool 64 is received within the opening or bore 66. Spring 65 is seated on the plug 67 which threadedly engages the opening 68 in the valve housing 37. The clutch control valve spool 64 is shifted from its illustrated spring biased clutch disengaged position to its clutch engaged position by a pilot hydraulic circuit which includes an orifice 80, the solenoid valve 17 and the accumulator supply passage comprising passages 52, 53. The orifice 80 constitutes a fluid flow restrictor which connects the chamber 71 and port 70 with the recess 49 and inlet port 33 of the solenoid valve.

Pump pressure from the pump 46 passes through the conduit 48 into the passage 70 into the chamber 71. The chamber 71 is in communication with an input port or valve chamber 72. The ports 73 in the spool 64 are in communication with the central passage 74 of the spool 64 and allow fluid to flow through the passage 75 in the plug 67. Passage 75 is in communication with the conduit 76 which is connected to the hydraulic actuator 77 in the hydraulic clutch 19. Hydraulic clutch 19 is a power shift clutch which can be shifted while the vehicle is in motion.

Referring to FIG. 4, a pressure time diagram is shown. The vertical axis represents the pressure change while the horizontal axis represents time. As the solenoid valve is operated, the pressure in the modulating valve increases essentially as shown. Initially, a low pressure fluid passes to the hydraulic clutch and the pressure gradually increases with time. Initially there is partial slippage of the clutch until the front wheel drive is engaged. This allows engagement without any roughness. The pressure rise is gradual until the clutch engages the front wheel drive of the vehicle.

Operation of the device will be described in the following paragraphs. During normal operation, when the vehicle is driving in the two wheel drive mode, the rear wheels 7 are driving the tractor. If it should be desired to engage the front wheel drive system, the switch 14, as shown in FIG. 3, is switched on. When switch 14 is closed, the solenoid coil 25 is energized causing the armature 24 to move downwardly which carries pin 28 and plunger 31 downwardly. This allows the pressure fluid in the chamber 71 to pass through the orifice 80, recess 49 and recess 32 to the outlet port 34 and annular recess 41. Pressurized fluid then flows through the passage 52 and 53 to the pressurizing chamber 54. Piston 159 begins to move against biasing force of the springs 61 and 65 moving the spool in the right-hand direction to a clutch engaged position. The port 73 then is uncovered and pressurized fluid from the chamber 71 is allowed to flow through the ports 73 to the central opening 74 and passage 75, conduit 76 to the hydraulic actuator 77 of the hydraulic clutch 19. The rate of pressure rise is controlled by the size of the orifice 80, the spring force and piston size. The diameter of spool 64 in the modulating valve also affects the rate of pressure rise. Pressure gradually increases in the system until the clutch is fully engaged. The rate of pressure rise of the pressurized fluid is essentially shown in FIG. 4 in which a degree of slippage for the clutch is allowed initially to avoid roughness in engaging and disengaging the clutch. When the clutch is fully engaged, the pump pressure is then used to retain engagement of the clutch.

When it is desired to disengage the front wheel drive, the switch 14 is moved in the off direction opening the switch 14 and causing the coil 25 to be deenergized, allowing the biasing force of the spring 27 to move the armature 24 and plunger 28 to the return position. In this position, pressurized fluid in the pressurizing chamber 54 is allowed to flow outwardly through the passages 53, 52 and the annular recess 41, through sump ports 45 and discharged through the sump passage 81 to the sump chamber 82 and sump 47. This allows the spool 64 to move in the left-hand direction until the ports 73 are also allowed to discharge fluid into the sump chamber 82. The pressure of the pressurized fluid in the hydraulic actuator 77 decreases until the clutch is released and the pressure in the actuator returns to sump pressure. The front wheel drive is then released and drive is solely through the conventional rear wheel drive system.

The embodiments of the invention in which an exclusive property or privilege is claimed are defined as follows:

1. In a tractor having front wheels, rear wheels, an engine and drive means connecting the engine to the front and rear wheels, a front wheel drive system comprising:
   a hydraulically actuated clutch including a hydraulic actuator operative to engage said clutch when it is supplied pressurized fluid, said clutch being disengaged when pressurized fluid is exhausted from said actuator,
   a reservoir,
   a pump connected in fluid receiving relation to said reservoir,
   a clutch control valve including
      a housing having
         an input port connected in fluid receiving relation to said pump,
         a clutch port connected in fluid delivery relation to said hydraulic actuator of said clutch,
         a sump chamber connected to said reservoir,
         a first cylindrical bore and a second bore aligned with said first bore,
      a fluid flow control spool reciprocatively mounted in said first bore for axial movement between a clutch engaged position in which said input port is connected to said clutch port and a clutch disengaged position in which said clutch port is connected to said sump chamber,
      spring means biasing said spool toward its clutch disengaged position,
      an accumulator piston in said second bore and defining therewith an accumulator chamber, and
      axial thrust transmitting means operatively interposed between said accumulator piston on said control spool, and
   a pilot hydraulic circuit operable to selectively connect said pump with said accumulator chamber including
      a solenoid pilot valve having a fluid connection to said reservoir, said solenoid pilot valve including a pilot valve element shiftable between a clutch engaging position in which said pump is connected in fluid delivery relation to said accumulator chamber and a clutch disengaging position in which the accumulator chamber is connected to said reservoir, and
      a fluid flow restrictor in said circuit, said restrictor and accumulator chamber being proportioned in relation to said spool to effect relatively slow movement of the latter from its clutch disengaged position to its clutch engaged position when said pilot valve element is moved to its clutch engaging position whereby a gradual pressure rise in said clutch actuator is effected.

2. The tractor of claim 1 wherein said solenoid valve is mounted on said housing, said solenoid valve is connected to said reservoir by way of said sump chamber and said pilot circuit is connected to said input port.

3. The tractor of claim 2 wherein said solenoid pilot valve includes a pilot valve bore in which said pilot valve element is reciprocatively mounted, one end of said bore being in direct fluid communication with said sump chamber.

4. The tractor of claim 3 wherein said solenoid pilot valve includes an inlet port and an accumulator port at said pilot valve bore and wherein said circuit includes an accumulator supply passage in said housing connecting said accumulator port in fluid communication with said accumulator chamber.

5. The tractor of claim 4 wherein said accumulator supply passage is connected to said sump chamber when said pilot valve element is shifted to its clutch disengaging position.

6. The tractor of claim 1 wherein said fluid flow restrictor is positioned between said pump and said pilot valve.

7. The tractor of claim 1 wherein said tractor includes an operator station and further comprising an electrical circuit connected in controlling relation to said solenoid valve and including an electrical switch at said operator station.

* * * * *

UNITED STATES PATENT OFFICE
CERTIFICATE OF CORRECTION

Patent No. 4,506,773            Dated March 26, 1985

Inventor(s) Robert E. Schott

It is certified that error appears in the above-identified patent and that said Letters Patent are hereby corrected as shown below:

Column 6, line 20, cancel "on" and substitute --- and ---.

Signed and Sealed this

Third Day of September 1985

[SEAL]

Attest:

DONALD J. QUIGG

Attesting Officer    Acting Commissioner of Patents and Trademarks - Designate